Dec. 19 1922.
H. E. ELROD.
SEWAGE DISPOSAL PLANT AND SYSTEM.
FILED JULY 7, 1921.
1,439,406
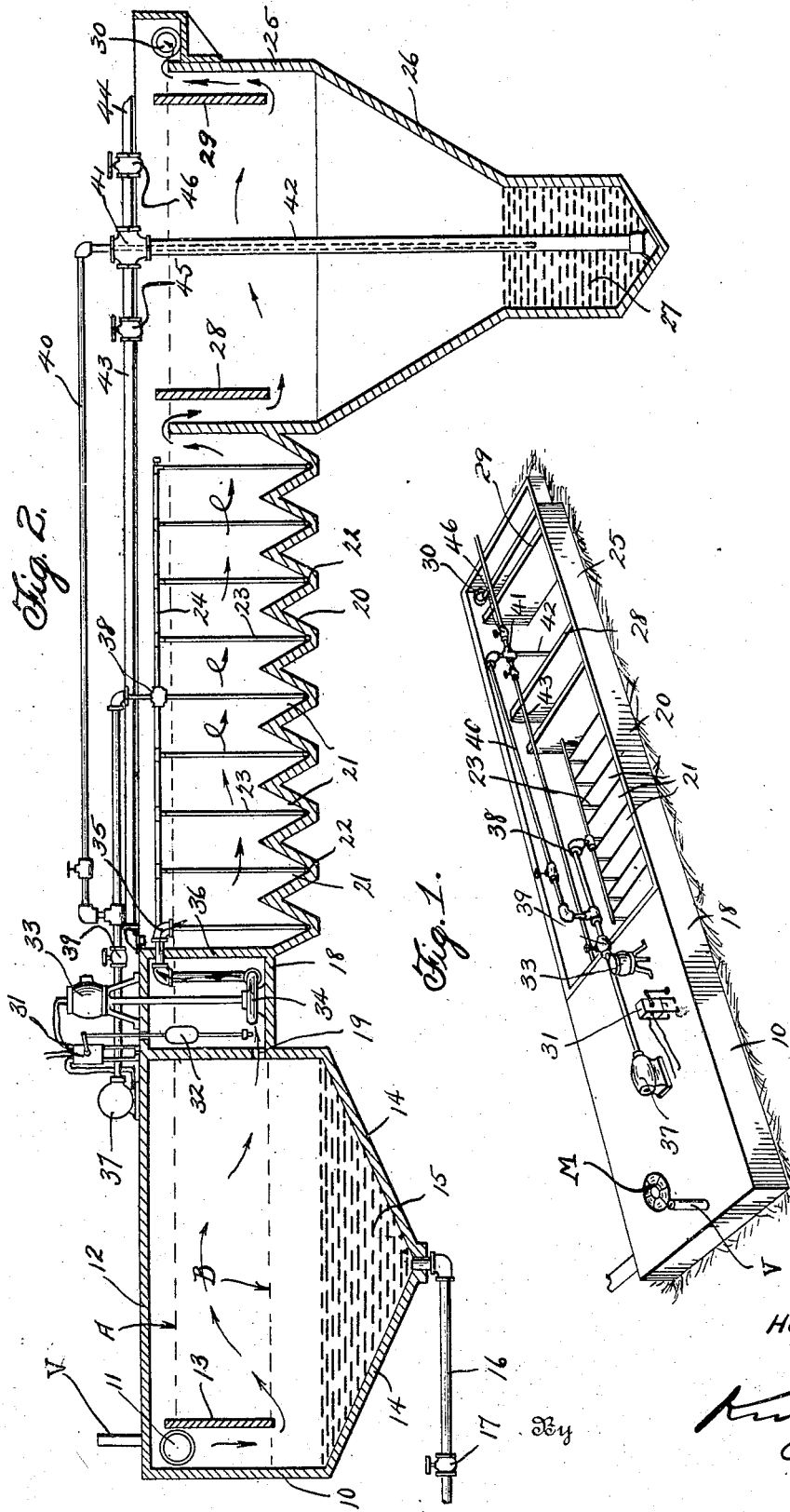
Inventor
Henry E. Elrod.
By Knight Bro
Attorneys Patented Dec. 19, 1922.

1,439,406

UNITED STATES PATENT OFFICE.

HENRY E. ELROD, OF DALLAS, TEXAS.

SEWAGE-DISPOSAL PLANT AND SYSTEM.

Application filed July 7, 1921. Serial No. 483,072.

*To all whom it may concern:*

Be it known, that I, HENRY E. ELROD, a citizen of the United States, and a resident of the city of Dallas, in the county of Dallas and State of Texas, have invented certain new and useful Improvements in a Sewage-Disposal Plant and System, of which the following is a specification.

My invention relates to a sewage disposal plant and system and particularly to one which utilizes the activated sludge method of sewage disposal.

In a system wherein the activated sludge method is employed the sewage is allowed to flow slowly through properly constructed tanks, upon the floors of which are provided suitable means for diffusing air under pressure through it. The rate of flow of the sewage and the quantity of air required is dependent upon the degree of purification desired. From these tanks which are known as aeration tanks the sewage flows into settling or sedimentation tanks where the sludge rapidly settles leaving the sewage clear and stable to be drawn off and disposed of as desired. The sludge as it settles is constantly drawn off and a portion of it returned to the fresh sewage in the aeration tanks for the purpose of "seeding" the same.

The purification of the sewage is accomplished through the rapid oxidation and nitrification by aeration of the organic matter of which it is composed, that is, the decomposition of such matter is accomplished chiefly through the agency of bacteria which require oxygen and nitrogen for sustenance of life. The minute particles of suspended organic matter or sludge become coated with colloidal or gelatinous films, each particle thus forming a small globule which is alive with aerobic bacteria, (that is, bacteria which live and exercise their functions in the presence of air), inherent in all domestic sewage. In a system such as is to be described and in the aeration tanks, these globules or colonies of bacteria are constantly supplied with air which rapidly oxidizes and nitrifies the finer particles of sludge, the larger particles adhering to the colloidal or jelly-like matter. When the sewage thereafter passes to the last tank, or as will be hereinafter referred to as the sedimentation tank, the colloidal masses settle out rapidly and completely, leaving a clear, stable liquid to be drawn off and disposed of.

Sewage disposal plants and systems which employ the activated sludge method of sewage treatment have been found efficient and desirable because this method of sewage treatment produces no appreciable odor and is not unsightly as is the case, more or less, with the plants required by other methods of sewage treatment. An objection, however, to the use of the activated sludge method of sewage disposal is that as now practiced, there is produced an excess of activated sludge, which must be disposed of; this sludge is highly putrescent and difficult to handle, without expensive machinery and equipment for dewatering, drying and otherwise preparing it for disposition.

It is therefore, the primary object of my invention to provide a sewage treatment plant which employs this activated sludge method and embodies certain other novel features which cooperate to provide an approved, efficient and semi-automatic plant, which will produce no excess of activated sludge to be disposed of.

In carrying out my invention, I construct what will be termed herein a preliminary treatment tank, designed to accommodate approximately an eight-hour flow of sewage. This tank may be provided with a hopper bottom or sludge chamber into which a large percent of solids or organic matter settles out of the sewage. Adjacent this tank is provided an aeration chamber into which the sewage contained in the preliminary treatment tank is transferred. This aeration tank is provided with a multiplicity of air diffusing pipes arranged so as to force air under pressure through the sludge and sewage which contains it, thereby setting the same in motion. This oxidizes the organic matter held in suspension in the sewage and intensifies the growth of bacteria which destroy this matter as has been previously explained.

Finally a sedimentation chamber is provided into which the aerated sewage flows and in which the velocity of the sewage has been so reduced that the flocci or colonies of bacteria which have surrounded each particle of organic matter may settle out into the bottom of this sedimentation chamber which will be termed herein the sludge chamber. The remaining sewage which has been cleared by the settling of the sludge resembles clear water of a stable character and flows off through suitable pipes into a stream or, in some instances, is used for irrigation.

In a system of this type the quantity of air required for aeration is directly proportionate to the quantity of organic matter contained in the sewage. Consequently, a reduction of the quantity of organic matter before aeration produces in effect, a reduction in the quantity of air required and hence, a reduction in the cost of operation of the plant which is considerable. This reduction of the quantity of organic matter contained in the sewage is effected by the provision of the preliminary treatment tank with its associated sludge chamber, which as hereinbefore stated, is adapted to accommodate an eight-hour (more or less) flow of sewage. Approximately 40% to 60% of the solids or organic matter settles out of the sewage and accumulates in the sludge chamber. This sludge digests in the ordinary way and at intervals of some two or three months may be drawn off onto suitable sludge beds and dried. This digested sludge is not offensive.

My invention further contemplates the provision of means which will automatically start a motor, when the pump compartment is full which motor drives a pump and a pressure blower. Thus the speed of the motor regulates the capacities of the pump and the blower, these capacities being directly proportionate to the amount of sewage directed from the preliminary treatment tank to the aeration tank. The purpose of the pump is to transfer the sewage from the preliminary treatment tank into the aeration chamber, while the purpose of the blower is to furnish air under pressure to the air diffusing pipes of the aeration chamber. When the pump sump is exhausted of its sewage the automatic means mentioned hereinbefore stops the motor and all operation consequently ceases until the pump compartment is again full whereupon the operation just described is repeated.

The system outlined hereinbefore will be amplified in the accompanying specification and a plant wherein the operation of this system may be accomplished will be likewise described. It should be understood, however, that the details of the plant illustrated in the drawings and described hereinafter is only one practical embodiment of the various types of plants which may be employed to accomplish the benefits of my improved system.

Referring now to the drawings it will be seen that:

Figure 1 is a perspective view of a plant constructed in accordance with my invention, and Figure 2 is a longitudinal section thereof on an enlarged scale.

In the drawings the numeral 10 indicates the preliminary treatment tank provided with an inlet 11 for the sewage. This tank is preferably provided with a cover 12 and a baffle wall 13 disposed transversely to the flow of sewage. The cover is further provided with a manhole M and a vent pipe V. The bottom of this preliminary treatment tank may be inclined as shown at 14 to form a hopper-shaped bottom or sludge chamber 15.

A sludge withdrawal pipe 16 communicates with the sludge compartment 15 and a valve 17 controls the flow of sludge therethrough.

Disposed immediately adjacent or remote from the preliminary treatment tank is what will be termed a pump compartment 18 which communicates with the preliminary flow tank through an opening 19, which opening is preferably disposed near the bottom of this pump compartment.

Adjacent or remote from the pump compartment is an aeration tank 20 which as shown, is preferably open at its top side and has its bottom formed with baffle walls shaped to form a multiplicity of V-shaped channels 21. Air is distributed throughout the contents of this aeration chamber by a multiplicity of perforated pipe grids 22 or other suitable means for diffusing air, which lie in the bottom of these V-shaped channels and are connected by pipes 23 to a main supply line 24.

Arranged adjacent the aeration tank 20 is a sedimentation tank 25 provided with tapering walls 26 which terminate in a sludge compartment 27 arranged at the bottom thereof. Baffle walls 28 and 29 are disposed at the top of this sedimentation tank and transversely to the flow of sewage. A sewage outflow pipe 30 arranged at one side of the sedimentation tank is adapted to convey the settled sewage which is generally in the form of clear water to a stream or to some other means of disposal.

Arranged preferably over the pump compartment is a switch 31 suitably connected to a float 32 which works in this pump compartment. A motor 33 disposed also over the pump compartment is provided with a pump 34 resting upon the bottom of the pump compartment 18 and is further provided with piping 35 which extends upwardly and through a partition 36 into the aeration tank. An electric motor blower 37 is connected by piping 38 to the main pipe 24 which supplies air to the perforated pipe grids 22. A valve 39 may be interposed in this piping if desired. The motor blower 37 is further connected by piping 40 to a union 41 from which branch off pipes 42, 43 and 44. The pipe 42 extends to the bottom of the sludge chamber 27 and is adapted to withdraw any sludge which may accumulate therein, which sludge may be conveyed away by means of pipe 44. The pipe 43 extends to a point over the aeration chamber 20 and is for the purpose of returning the sludge to the aeration chamber to keep this chamber well "seeded" with bacteria. Valves 45 and 46 may be inserted in the pipe lines just described for the purpose of controlling the disposition of sludge. Although the pipes 44 and 16 are illustrated as extending in opposite directions, in practice they are conducted to a single sludge drying bed, constructed adjacent the outflow end of the plant whereby the sludge drawn from the sludge compartments 15 and 27 and spread out and dried.

The float controlled switch 31 is electrically connected to the electric motor pump 33 and electric motor blower 37 so that when this switch is actuated by the float 32 it closes an electrical circuit which starts the pump and blower motors 33 and 37. When the float has moved downward to the lower extent of its travel by reason of the exhaustion of sewage within the pump compartment 18 the switch will be operated to shut off the pump and blower motors 33 and 37. The operation of the plant will now be briefly described.

The raw sewage is conducted into a preliminary treatment tank 10 which as hereinbefore stated will be of such proportions as to be capable of accommodating an eight-hour (more or less) flow. The organic matter held in suspension in the sewage will to a large extent, settle out of the sewage and into the sludge compartment 15 because of the inactivity of the sewage, the sewage being unable to sustain the organic matter suspended therein during this period of inactivity.

It has been found through experiment, that approximately 40% to 60% of the solids settle out and are collected in the sludge compartment at the bottom of the preliminary treatment tank. The sludge accumulating in this chamber digests in the ordinary way and at intervals of two or three months can be drained off on to suitable sludge beds through sludge withdrawal means 16 and dried.

When sufficient sewage has accumulated in the pump compartment to have reached the level indicated by dotted line A, the float 32 will function to operate the electric switch 31 which starts the motors 33 and 37, which operate the pump and blower respectively. It is obvious that the sewage will be admitted into the pump compartment 18 through the opening 19 formed in the wall therebetween. When therefore the pump has been started the sewage will be pumped through pipe line 35 into the aeration chamber and simultaneously the blower will blow air under pressure to the perforated pipe grids 22 which air is diffused through the sewage and sludge in the aeration chamber. As has been previously stated this air assists in oxidizing the organic matter held in suspension in the sewage and intensifies the growth of bacteria which destroy this matter.

Because approximately 40% to 60% of the solids have previously settled out of the sludge and into the sludge compartment 15 it follows that the amount of air which it is necessary for the blower 37 to supply is proportionately less than would have been required had this premature treatment of the sludge not occurred. The reduction in the amount of air required per gallon of sewage necessarily affects the cost of operation of the plant.

The pump and blower continue to function until quantity of sewage contained in the pump compartment 18 has reached the level indicated by the line B, when the float 32 will actuate the switch to shut off the motors which drive this pump and blower. The sewage supplied to the aeration tank 20 follows in general the course indicated by the arrows and flows over the side wall and into the sedimentation tank 26. The remainder of the solids thereupon settle out of the sewage and into the sludge compartment 27 from which they may be drained off through pipes 42 and 44. The remainder of the sewage which resembles clear water and is of stable character flows over the end wall of sedimentation chamber 25 and is carried off through outflow pipe 30. For the purpose of "seeding" the sewage contained in the aeration chamber the branch pipe 43 is provided through which sludge from sludge chamber 27 may be pumped.

In addition to saving approximately 40% to 60% of the air usually required, the motor which furnishes the air and pumps the sewage is permitted to enjoy alternate periods of rest and consequently lasts longer and requires less attention and maintenance than would be required if this motor were in continuous operation. A saving is also effected in the cost of superintendence in that no superintendence is required at the rest periods and very little other times. Furthermore, biological action will continue during the rest periods which tends to effect the saving in air mentioned hereinbefore inasmuch as this action will probably produce a larger percent of reduction of the solids in the preliminary treatment tank than has been suggested.

In general, my invention contemplates a preliminary treatment of the sewage by which a large percentage of the suspended solids may be eliminated before the sewage is conducted to the aeration chamber, thus effecting a considerable saving per gallon in the amount of air required for treating this sewage. My invention further contemplates in general the provision of means which will automatically cause the pump and blower to function their operation ceasing when the necessity thereof has ceased. My invention further contemplates that, by the reduction of the solids in the preliminary treatment tank, there will not be more than sufficient solids in the sewage, when aerated, to produce a sufficient quantity of sludge for the proper seeding of the aeration tank with bacteria, hence there will not be an accumulation of excess activated sludge to be disposed of.

As has been stated hereinbefore, the plant illustrated herein is but one embodiment of this general type of plant which may be employed to advantage in a system such as described herein and I particularly reserve the right to make such modifications as may be consistent with the system described and which will come within the purview of the accompanying claims.

Having thus described my invention, what I claim is:

1. A sewage disposal system employing the activated sludge method comprising a preliminary treatment tank wherein sewage is accumulated and a certain proportion of the solids permitted to settle and anaerobic bacteria in the sewage permitted to function, an aeration chamber into which the sewage is conducted, means for supplying air to the aeration chamber whereby the aerobic bacteria of the sewage is permitted to function, means dependent upon the amount of sewage in the preliminary treatment tank for causing said sewage to flow into the aeration chamber and for supplying air thereto and a sedimentation tank into which the sewage is conducted whereby the suspended solid matter settles.

2. A sewage disposal system employing the activated sludge method comprising a preliminary treatment tank in which sewage is accumulated and a proportion of the solids permitted to settle and preliminarily treated by permitting the anaerobic bacteria in the sewage to function, an aeration chamber into which the sewage is conducted, means for diffusing air through the contents of said aeration chamber for additionally treating the sewage by permitting the aerobic bacteria therein to function, a pump compartment and means dependent upon the amount of sewage in said pump compartment for transferring the sewage from the preliminary treatment tank to said aeration chamber and for supplying air to said aeration chamber, a sedimentation chamber into which the sewage is conducted whereby any suspended solid matter may settle and means for carrying off the resulting liquid sewage.

3. A sewage disposal plant and system of the class described which comprises a preliminary treatment tank into which raw sewage may be admitted, said tank being designed to accumulate a pre-determined amount of sewage, a sludge compartment communicating with said tank and into which a percentage of the solids contained in the sewage are adapted to settle, an aeration chamber, a pump for pumping the sewage from said preliminary treatment tank to said aeration chamber, means for diffusing air under pressure through the contents of said aeration chamber, a blower for furnishing air to said air diffusing means, a sedimentation chamber communicating with said aeration chamber and provided with a sludge compartment, means for carrying off the treated effluent from said sedimentation chamber and a float-operated means controlled by the sewage contained in said preliminary treatment tank for causing said blower and pump to function.

4. A sewage disposal system employing the activated sludge method which consists of accumulating raw sewage in a tank wherein a portion of the solids suspended therein will settle, thereafter subjecting the sewage which has been freed of some of its suspended solids to aeration, the proportion of air necessary during aeration corresponding to the percentage of solids sustained by the sewage and thereafter conducting the sewage to a sedimentation chamber where the remaining solids are permitted to settle out.

5. In a sewage disposal system employing the activated sludge method, a preliminary treatment tank wherein sewage is accumulated and wherein a proportion of the suspended solids are permitted to settle and the anaerobic bacteria in the sewage permitted to function, an aeration chamber into which the sewage is then conducted, means for supplying air to the contents of the aeration chamber whereby the aerobic bacteria in the sewage is caused to function, means for transferring the sewage from said preliminary tank to said aeration chamber, a pump compartment in communication with said preliminary treatment tank and means dependent upon the amount of sewage in said pump compartment for causing said sewage transferring means and said air supply means to function, a sedimentation tank into which the sewage is then conducted and wherein the remaining solids are permitted to settle and means for carrying off the resulting liquid sewage.

6. A method of sewage disposal which consists of accumulating raw sewage in a tank wherein a portion of the solids suspended therein are permitted to settle and the anaerobic bacteria in the sewage permitted to function thereby digesting and decomposing a percentage of the solids, conducting the sewage with the remaining suspended solids to a second tank and subjecting the sewage to aeration whereby the aerobic bacteria in the sewage is caused to function to complete the purification of the same by oxidizing and nitrifying the solids, the proportion of air required during aeration corresponding to the amount of solids sustained by the sewage and thereafter conducting the sewage to a third tank where the remaining solids are permitted to settle and the resulting clear liquid drawn off.

HENRY E. ELROD.